United States Patent
Murata

(10) Patent No.: US 8,858,086 B2
(45) Date of Patent: Oct. 14, 2014

(54) ROLLING BEARING

(71) Applicant: Jtekt Corporation, Osaka (JP)

(72) Inventor: Junji Murata, Kashiba (JP)

(73) Assignee: Jtekt Corporation, Osaka (JP)

( * ) Notice: Subject to any disclaimer, the term of this patent is extended or adjusted under 35 U.S.C. 154(b) by 0 days.

(21) Appl. No.: 14/025,053

(22) Filed: Sep. 12, 2013

(65) Prior Publication Data

US 2014/0079349 A1 Mar. 20, 2014

(30) Foreign Application Priority Data

Sep. 19, 2012 (JP) .................. 2012-205359

(51) Int. Cl.
*F16C 33/66* (2006.01)
*F16C 33/58* (2006.01)

(52) U.S. Cl.
CPC ......... *F16C 33/6614* (2013.01); *F16C 33/6651* (2013.01); *F16C 33/6681* (2013.01); *F16C 33/6696* (2013.01); *F16C 49/06* (2013.01); *F16C 33/585* (2013.01); *F16C 33/6648* (2013.01)
USPC ........... 384/462; 384/475; 384/516; 384/606; 384/625

(58) Field of Classification Search
CPC .... F16C 19/06; F16C 33/583; F16C 33/6614; F16C 33/6651; F16C 33/6681
USPC ......... 384/462, 475, 490, 513, 516, 596, 606, 384/609–610, 622, 625
See application file for complete search history.

(56) References Cited

U.S. PATENT DOCUMENTS

| 1,269,808 | A | | 6/1918 | Gray et al. |
| 3,370,899 | A | | 2/1968 | Eklund |
| 4,916,751 | A | * | 4/1990 | Sumita et al. ............. 384/491 |
| 5,498,086 | A | * | 3/1996 | Ou ............................ 384/491 |
| 6,132,097 | A | * | 10/2000 | Kellstrom ................. 384/450 |
| 6,238,744 | B1 | * | 5/2001 | Magoulick et al. ....... 384/625 |

(Continued)

FOREIGN PATENT DOCUMENTS

| DE | 10 2005 018616 A1 | 10/2006 | |
| EP | 1533533 A1 * | 5/2005 | ............ F16C 19/08 |
| EP | 2250384 B1 * | 3/2013 | |
| JP | U-05-8045 | 2/1993 | |

(Continued)

OTHER PUBLICATIONS

Jun. 11, 2014 Extended European Search Report issued in European Patent Application No. 13 18 4556.2.

*Primary Examiner* — Marcus Charles
(74) *Attorney, Agent, or Firm* — Oliff PLC

(57) ABSTRACT

A bearing includes an inner ring, an outer ring, and a plurality of rolling elements. In the bearing, each of an inner ring raceway surface and an outer ring raceway surface has a contact area that comes into contact with the rolling elements, and a non-contact area that is formed adjacent to an outer side of an end portion of the contact area and does not come into contact with the rolling elements. A lubricant retaining portion having a recessed portion and a large number of non-uniform projections and depressions is formed at the non-contact area of at least one of the inner ring raceway surface and the outer ring raceway surface.

7 Claims, 4 Drawing Sheets

(56) References Cited

U.S. PATENT DOCUMENTS

| | | | |
|---|---|---|---|
| 6,923,576 B2* | 8/2005 | Tanaka et al. | 384/492 |
| 6,986,606 B2* | 1/2006 | Hoya et al. | 384/462 |
| 7,448,806 B2* | 11/2008 | Ishiguro et al. | 384/417 |
| 7,543,385 B2* | 6/2009 | Kaminski et al. | 29/898.13 |
| 7,703,985 B2* | 4/2010 | Olsen | 384/510 |
| 2004/0005103 A1* | 1/2004 | Tanaka et al. | 384/492 |
| 2004/0032998 A1* | 2/2004 | Iwata et al. | 384/513 |
| 2004/0076355 A1* | 4/2004 | Ishiguro et al. | 384/516 |
| 2006/0171622 A1* | 8/2006 | Ohata et al. | 384/513 |
| 2009/0034892 A1* | 2/2009 | Akamatsu et al. | 384/473 |
| 2009/0129713 A1* | 5/2009 | Hattori | 384/462 |
| 2009/0226244 A1* | 9/2009 | Byrnes et al. | 403/135 |

FOREIGN PATENT DOCUMENTS

| | | | | |
|---|---|---|---|---|
| JP | 11241726 A | * | 9/1999 | F16C 33/32 |
| JP | A-2004-176833 | | 6/2004 | |
| JP | 2005036864 A | * | 2/2005 | F16C 33/58 |
| JP | 2006038000 A | * | 2/2006 | |
| JP | A-2008-089025 | | 4/2008 | |
| JP | 2009002436 A | * | 1/2009 | |
| JP | A-2009-115187 | | 5/2009 | |
| JP | A-2009-121659 | | 6/2009 | |
| SU | 486 161 | | 9/1975 | |
| WO | WO 2009111773 A1 | * | 9/2009 | |

* cited by examiner

US 8,858,086 B2

ROLLING BEARING

INCORPORATION BY REFERENCE

The disclosure of Japanese Patent Application No. 2012-205359 filed on Sep. 19, 2012 including the specification, drawings and abstract, is incorporated herein by reference in its entirety.

BACKGROUND OF THE INVENTION

1. Field of the Invention

The invention relates to a rolling bearing.

2. Description of Related Art

If an amount of a lubricant (mainly, lubricating oil) supplied to a rolling bearing becomes excessively large, stirring resistance of the lubricant during the rotation of the bearing increases, and thus it becomes difficult to achieve lower torque. Further, if the amount of the supplied lubricant is insufficient, seizure may occur. In order to improve lubricating ability of the rolling bearing, for example, a rolling bearing (an angular contact ball bearing) described in Japanese Utility Model Application Publication No. 5-8045 (JP 5-8045 U) is known. In this rolling bearing, a recess portion, one side of which reaches a raceway shoulder portion, is formed by recessing a portion with which a ball does not come into contact, in a raceway surface of an inner ring or an outer ring, over the entire circumference. (refer to JP 5-8045 U, for example).

In the rolling bearing described in JP 5-8045 U, lubricating oil retained in the recess portion adheres to the ball, and thus, lubrication is performed. However, the lubricating oil retained in the recess portion easily flows out, and thus it is assumed that it becomes difficult to secure the lubricating ability over a long period of time.

SUMMARY OF THE INVENTION

An object of the present invention is to provide a rolling bearing in which lubricating ability is able to be maintained over a long period of time by increasing lubricant retention ability.

According to an aspect of the invention, there is provided a rolling bearing including an inner ring; an outer ring disposed around an outer periphery of the inner ring with an annular space between the outer ring and the inner ring in a manner such that the outer ring and the inner ring are disposed on a same center line; and a plurality of rolling elements rollably disposed between an inner ring raceway surface formed on an outer peripheral surface of the inner ring and an outer ring raceway surface formed on an inner peripheral surface of the outer ring, wherein each of the inner ring raceway surface and the outer ring raceway surface has a contact area that comes into contact with the rolling elements, and a non-contact area that is formed adjacent to an outer side of an end portion of the contact area and does not come into contact with the rolling elements, and at the non-contact area of at least one of the inner ring raceway surface and the outer ring raceway surface, a lubricant retaining portion that retains a lubricant is formed by a recessed portion and a large number of non-uniform projections and depressions provided in a bottom face of the recessed portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described.

Figure 1:
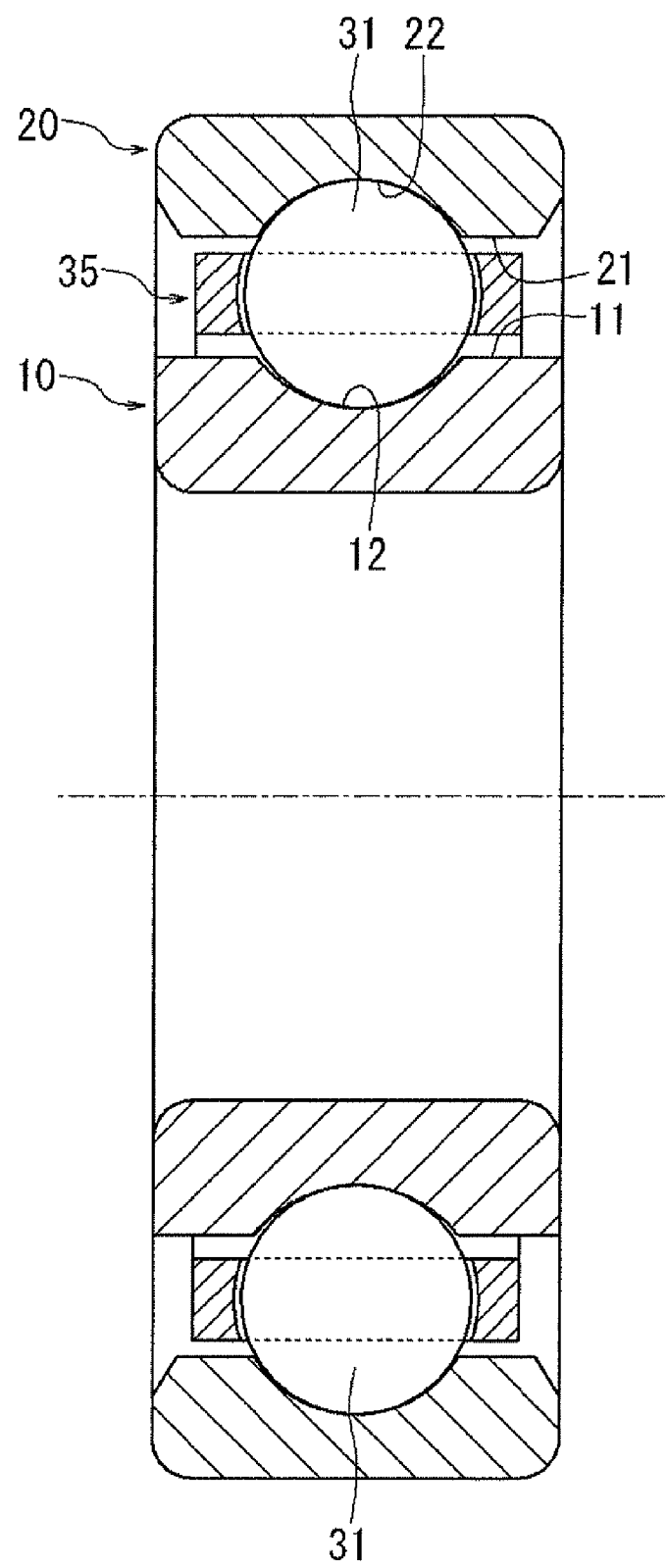
FIG. 1 is a sectional view of a rolling bearing according to a first embodiment of the invention, the sectional view being taken along an axial direction.

A first embodiment of the invention will be described according to FIGS. 1 to 4. In this embodiment, a case where a rolling bearing is a deep groove ball bearing is described. As shown in FIG. 1, the deep groove ball bearing as the rolling bearing includes an inner ring 10, an outer ring 20, a plurality of balls 31 as rolling elements, and a cage 35. The inner ring 10 is formed in a cylindrical shape and an inner ring raceway surface 12 forming an arc-shaped annular groove is formed at an axial central portion of an outer peripheral surface 11 of the inner ring 10.

Figure 2:
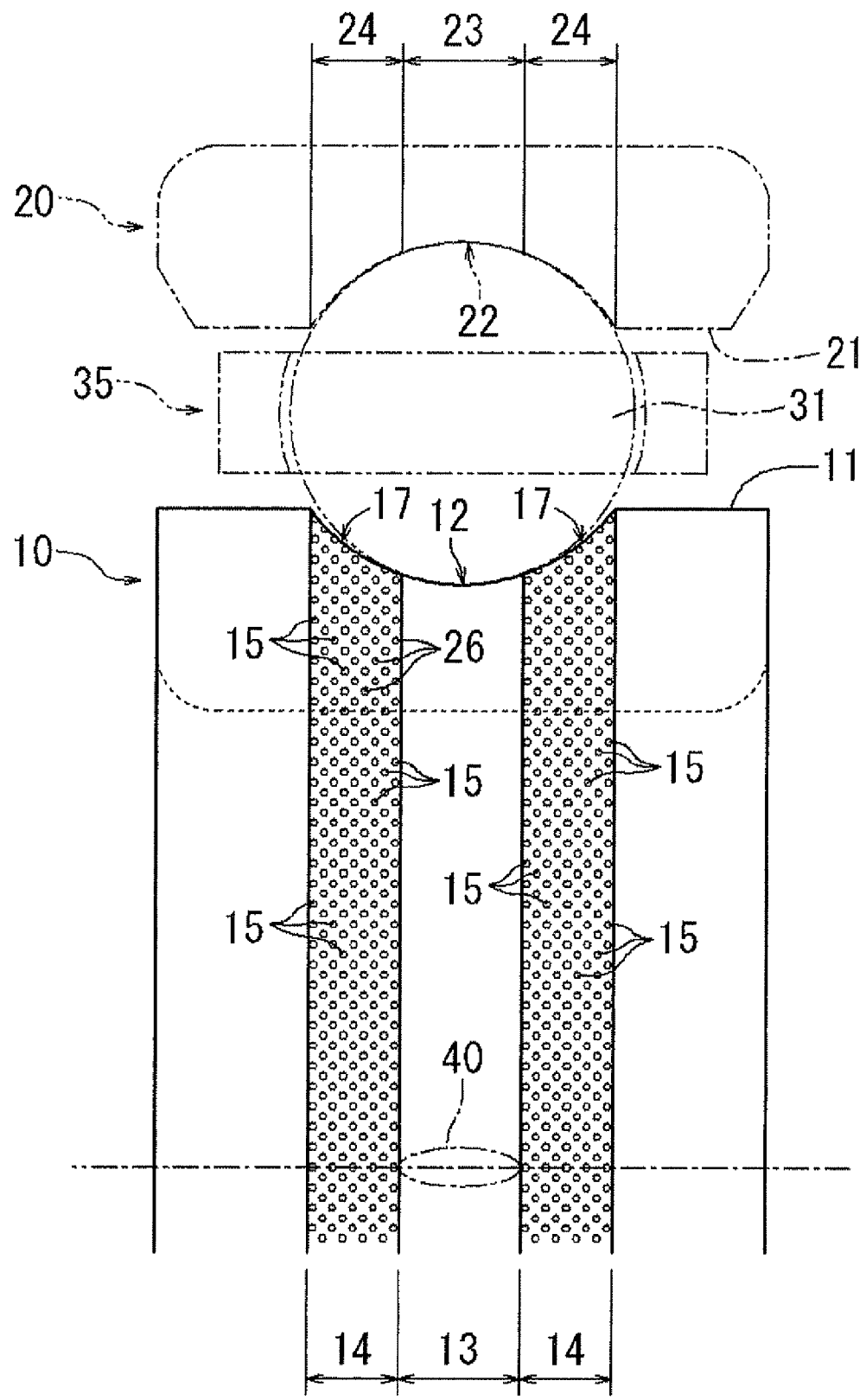
FIG. 2 is a side view of an inner ring showing an inner ring raceway surface according to the first embodiment of the invention.

As shown in FIGS. 1 and 2, the outer ring 20 is formed in a cylindrical shape having an inside diameter larger than an outside diameter of the inner ring 10. The outer ring 20 is disposed around an outer periphery of the inner ring 10 with an annular space between the outer ring 20 and the inter ring 10 in a manner such that the outer ring 20 and the inner ring 10 are disposed on the same center line. An outer ring raceway surface 22 forming an arc-shaped annular groove is formed at an axial central portion of an inner peripheral surface of the outer ring 20. The balls 31 are rollably disposed between the inner ring raceway surface 12 and the outer ring raceway surface 22 in a state in which the balls 31 are retained by the cage 35.

As shown in FIG. 2, the inner ring raceway surface 12 and the outer ring raceway surface 22 have contact areas 13 and 23, respectively, and have non-contact areas 14 and 24, respectively. The contact areas 13 and 23 come into contact with the balls 31. The non-contact areas 14 are formed adjacent to outer sides of opposite end portions of the contact area 13, respectively, and the non contact areas 24 are formed adjacent to the outer sides of opposite end portions of the contact area 23, respectively. The non-contact areas 14 and 24 do not come into contact with the balls 31. In addition, an ellipse indicated by a long dashed double-short dashed line in FIGS. 2 and 3 shows a contact ellipse 40 that comes in contact with the ball 31 and a width of each of the contact areas 13 and 23 in an axial direction is equivalent to a major axis of the contact ellipse 40.

Figure 3:
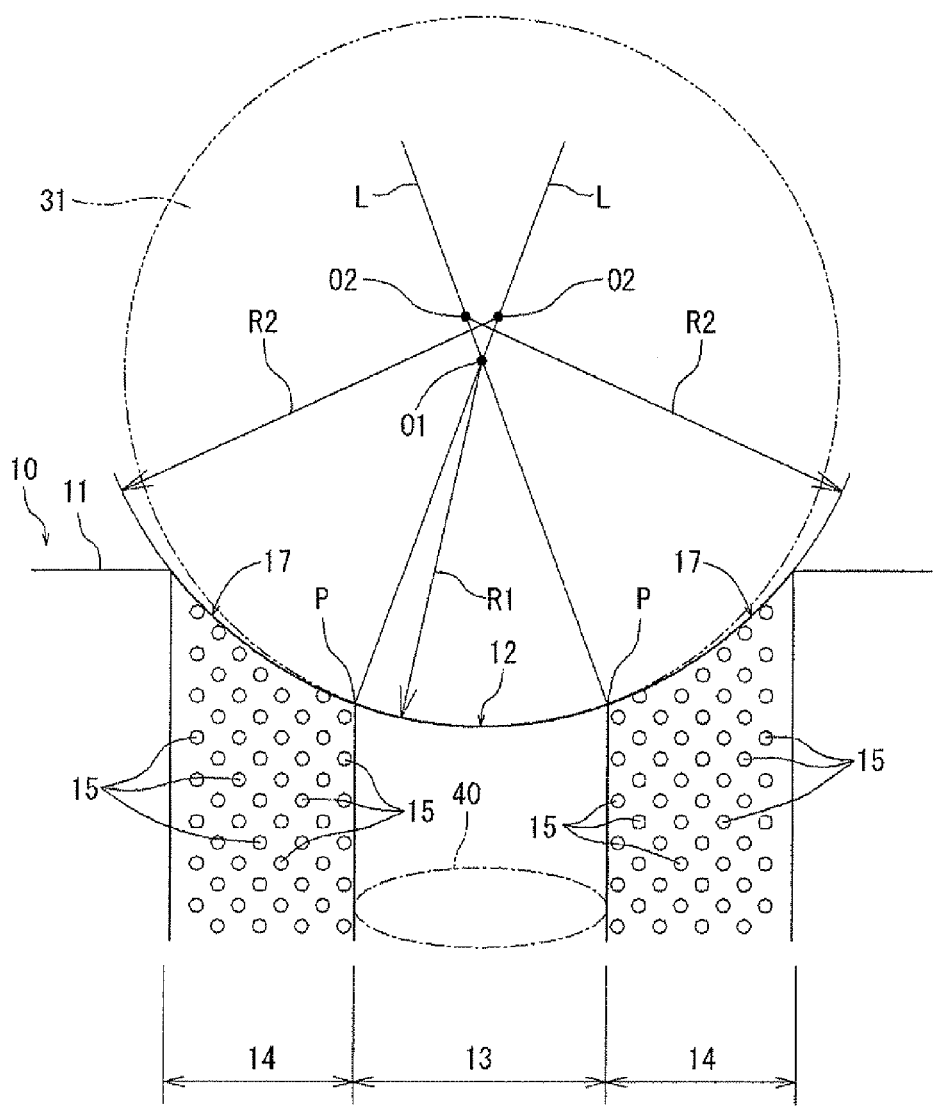
FIG. 3 is an enlarged side view showing a large number of dimples formed on the inner ring raceway surface according to the first embodiment of the invention.

As shown in FIG. 3, lubricant retaining portions 17 are formed at the respective non-contact areas 14 of at least one of the inner ring raceway surface 12 and the outer ring raceway surface 22. In the first embodiment, the lubricant retaining portions 17 are formed at the respective non-contact areas 14 of the inner ring raceway surface 12. Each of the lubricant retaining portions 17 has recessed portions which retain a lubricant such as high viscosity grease or oil-containing polymer, and a large number of non-uniform projections and depressions formed in the bottom face of each recessed portion.

Figure 4:
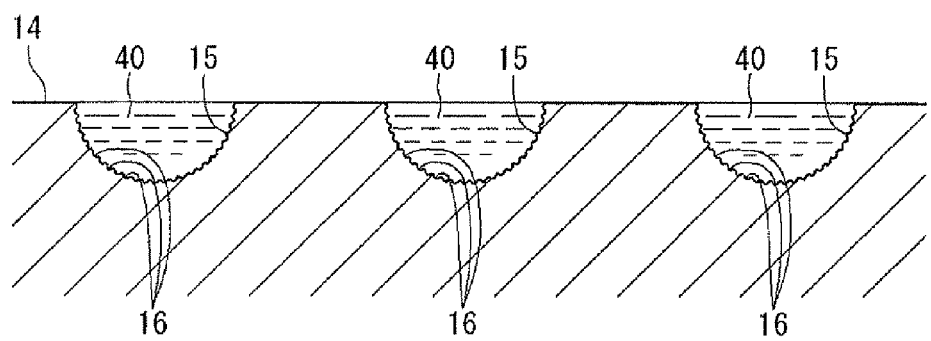
FIG. 4 is an enlarged sectional view showing the dimples of the inner ring raceway surface according to the first embodiment of the invention, the sectional view being taken along the axial direction.

In the first embodiment, a large number of recessed portions are formed in each of the lubricant retaining portions 17, and each of the recessed portions is formed by an independent dimple 15. In addition, as shown in FIG. 4, the large number of non-uniform fine projections and depressions 16 are formed in the bottom face of each of the large number of dimples 15. The non-uniform projections and depressions 16 are projections and depressions that are formed without being arranged along a predetermined direction, that is, the non-uniform projections and depressions 16 are not projections and depressions that are formed along a predetermined direction by performing, for example, a cutting process. In the first embodiment, as will be described later, the non-uniform projections and depressions 16 are formed by performing a shot blasting treatment. Thus, in the first embodiment, the non-uniform projections and depressions 16 are formed by disposing depressions formed by particles of abrasive material, in the bottom face of each dimple 15. Thus, it is possible to easily form the non-uniform projections and depressions 16 by using the shot blasting treatment, and it is possible to adjust the fineness of projections and depressions by appropriately changing the particle diameter of the abrasive material. Further, in the first embodiment, the large number of dimples 15 as the recessed portions are formed over the entire non-contact areas 14. Further, when the shot blasting treatment is performed to form the fine projections and depressions 16, the contact area 13 is masked.

Further, in the first embodiment, the section of the contact area 13 of the inner ring raceway surface 12 is formed to be an arc groove having a curvature radius slightly larger than the radius of the ball 31, the section being taken along the axial direction. Further, the section of each of the both non-contact areas 14 adjacent to the outer sides of the opposite end portions of the contact area 13 is formed to be an arc groove which is smoothly continuous with a corresponding one of opposite ends P of the arc groove of the contact area 13 (without a stepped surface), the section being taken along the axial direction. As shown in FIG. 3, when the curvature radius of the arc groove of the contact area 13 and the curvature radius of the arc groove of each of the non-contact areas 14 are set so as to satisfy the relationship of "R1<R2", where R1 is the curvature radius of the arc groove of the contact area 13 and R2 is the curvature radius of the arc groove of each of the non-contact areas 14.

In the first embodiment, a center O2 of the arc of each of the arc grooves of the both non-contact areas 14 is set on a line L which passes through a corresponding one of the opposite ends P of the arc groove of the contact area 13 and a center O1 of the arc groove of the contact area 13. Each of the arc grooves of the both non-contact areas 14 is formed such that a separating distance between the arc groove of the non-contact area 14 and the ball 31 gradually increases toward an outside from an inside adjacent to a corresponding one of the opposite end portions of the contact area 13.

The deep groove ball bearing as the rolling bearing according to the first embodiment is configured as described above. Therefore, a lubricant such as high viscosity grease or oil-containing polymer is applied onto the lubricant retaining portion 17 of the non-contact area 14 of the inner ring raceway surface 12 and the lubricant is retained in the large number of dimples 15 of the lubricant retaining portion 17. Further, the lubricant retaining portion 17 having the large number of dimples 15 is formed at the non-contact area 14, whereby lubricant retention ability can be increased, as compared to a case where the non-contact area 14 is formed to be a smooth surface. In addition, the fine projections and depressions 16 are formed in the bottom faces of the large number of dimples 15, whereby the lubricant retention ability can be even more increased. In particular, in the first embodiment, the non-uniform projections and depressions 16 are formed without being arranged along a predetermined direction, in the bottom face of each dimple 15 as the recessed portion, whereby it is possible to suppress the flow of the lubricant in a predetermined direction, and it is possible to retain the lubricant in the depressions among the projections and depressions 16, and thus it is possible to even more increase the retention ability. Accordingly, it is possible to gradually supply the lubricant retained in the large number of dimples 15 to the contact area 13 of the inner ring raceway surface 12, and thus it is possible to maintain lubricating ability over a long period of time.

Further, the curvature radius R2 of the arc groove of the non-contact area 14 is set to be larger than the curvature radius R1 of the arc groove of the contact area 13, whereby the inclination of the non-contact area 14 becomes gentle, as compared to a case where the non-contact area 14 is formed to be an arc surface having the same center and the same radius as those of the contact area 13. For this reason, the lubricant retained in the large number of dimples 15 of the lubricant retaining portion 17 does not easily flow, and thus, the lubricant retention ability is high.

Further, in the first embodiment, the arc groove of the non-contact area 14 having the curvature radius R2 larger than the curvature radius R1 of the arc groove of the contact area 13 is formed such that a separating distance between the arc groove of the non-contact area 14 and the ball 31 gradually increases toward the outside from the inside adjacent to the outer side of the end portion of the contact area 13. For this reason, a larger quantity of lubricant can be retained in the non-contact area 14.

Figure 5:
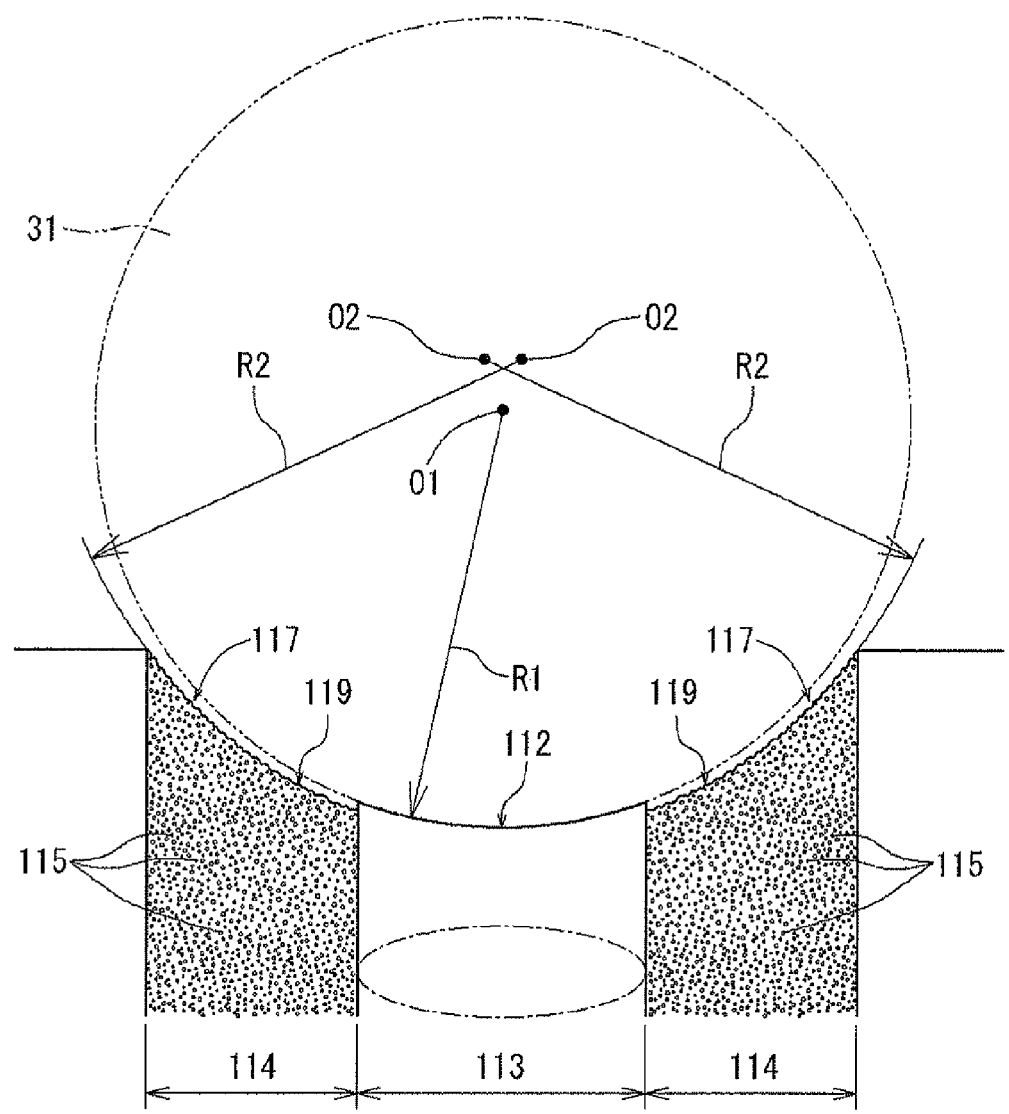
FIG. 5 is a sectional view of a rolling bearing according to a second embodiment of the invention, the sectional view being taken along the axial direction.

Next, a second embodiment of the invention will be described with reference to FIG. 5. In the second embodiment, lubricant retaining portions 117 are formed at respective non-contact areas 114 of an inner ring raceway surface 112, and each of the lubricant retaining portions 117 is formed by a recessed portion 119 and a large number of non-uniform projections and depressions 115. The recessed portion 119 is recessed in the non-contact area 114. The projections and depressions 115 are provided in the bottom face of the recessed portion 119. Further, in the second embodiment, the recessed portion 119 is formed in a stepped manner over the entire non-contact area 114 such that the recessed portion 119 is recessed to be lower than a contact area 113 and reaches a raceway shoulder portion on one side. Thus, while the lubricant is retained in the recessed portion 119, the lubricant flows out little by little to the contact area 113 along a slope of the recessed portion 119. The large number of projections and depressions 115 can be easily formed by shot blasting. The particle diameter of abrasive material used in the shot blasting in order to form the large number of projections and depressions 115 is smaller than the particle diameter of the abrasive material used in the shot blasting in the first embodiment.

Further, in the second embodiment, the curvature radius of an arc groove of the contact area 113 and the curvature radius of an arc groove of each of the both non-contact areas 114 are set so as to satisfy the relationship of "R1<R2", where R1 is the curvature radius of the arc groove of the contact area 113 and R2 is the curvature radius of the arc groove of each of the both non-contact areas 114. Thus, the recessed portion 119 recessed in a stepped manner is formed over the entire non-contact area 114. Since other portions in the second embodiment have the same configuration as those in the first embodiment, description thereof is omitted.

In the deep groove ball bearing as the rolling bearing according to the second embodiment, which is configured as described above, a lubricant such as high viscosity grease or oil-containing polymer is applied onto the lubricant retaining portion 117 of the non-contact area 114 of the inner ring raceway surface 112 and the lubricant is retained in the large number of non-uniform projections and depressions 115 in the lubricant retaining portion 117. The lubricant retaining portion 117 having the large number of projections and depressions 115 is formed at the non-contact area 114, whereby the lubricant retention ability can be increased, as compared to a case where the non-contact area 114 is formed to be a smooth surface. Accordingly, it is possible to gradually supply the lubricant retained in the large number of projections and depressions 115 to the contact area 113 of the inner ring raceway surface 112, and thus it is possible to maintain the lubricating ability over a long period of time.

The invention is not limited to the first and second embodiments described above and can be implemented in various forms without departing from the scope of the invention. For example, in each of the first and second embodiments described above, the case where the large number of projections and depressions 16 or 115 in the lubricant retaining portion 17 or 117 of the non-contact area 14 or 114 are formed by shot blasting has been described. However, it is also possible to form the large number of projections and depressions 16 or 115 by form rolling, etching, or the like. Further, in each of the first and second embodiments described above, the case where the lubricant retaining portion 17 or 117 is formed at the non-contact area 14 or 114 of the inner ring raceway surface 12 or 112 has been described. However, the invention may be implemented by forming the lubricant retaining portion at the non-contact area 14 or 114 of the inner ring raceway surface 12 or 112 and/or the non-contact area 24 of the outer ring raceway surface 22. Further, in each of the first and second embodiments described above, the case where the rolling bearing is the deep groove ball bearing has been described. However, the rolling bearing may be an angular contact ball bearing or a roller bearing. In a case where the rolling bearing is the roller bearing, a roller is formed in a crowning shape.

According to the configurations described above, the curvature radius R2 of the arc groove of the non-contact area is set to be larger than the curvature radius R1 of the arc groove of the contact area, whereby the inclination of the non-contact area becomes gentle, as compared to the case where the non-contact area is formed to be the arc surface having the same center and the same radius as those of the contact area. For this reason, the lubricant retained in the lubricant retaining portion does not easily flow, and thus the lubricant retention ability is high. Further, the arc groove of the non-contact area having the curvature radius R2 larger than the curvature radius R1 of the arc groove of the contact area is formed such that a separating distance between the arc groove of the non-contact area and the ball gradually increases toward the outside from the inside adjacent to the outer side of the end portion of the contact area, whereby a larger quantity of lubricant can be retained in the non-contact area.

What is claimed is:
1. A rolling bearing comprising:
an inner ring;
an outer ring disposed around an outer periphery of the inner ring with an annular space between the outer ring and the inner ring;
a plurality of rolling elements rollably disposed between an inner ring raceway surface formed on an outer peripheral surface of the inner ring and an outer ring raceway surface formed on an inner peripheral surface of the outer ring, each of the inner ring raceway surface and the outer ring raceway surface including:
(1) a contact area configured to contact the rolling elements, and
(2) a non-contact area formed adjacent to an outer side of an end portion of the contact area and configured to not contact the rolling elements;
wherein, at the non-contact area of at least one of the inner ring raceway surface and the outer ring raceway surface, a lubricant retaining portion configured to retain a lubricant is formed by a recessed portion, and a plurality of non-uniform projections and depressions are provided in a bottom face of the recessed portion and are formed without being arranged along a predetermined direction.

2. The rolling bearing according to claim 1, wherein the lubricant retaining portion is formed over the entire non-contact area.

3. The rolling bearing according to claim 1, wherein each of the rolling elements is constituted by a ball,
a section of the contact area taken along an axial direction is formed to be an arc groove having a curvature radius slightly larger than a radius of the ball,
a section of the non-contact area taken along the axial direction is formed to be an arc groove that is continuous with an outer side of an end portion of the arc groove of the contact area,
the curvature radius of the arc groove of the contact area and a curvature radius of the arc groove of the non-contact area are set so as to satisfy a relationship of R1<R2, where R1 is the curvature radius of the arc groove of the contact area and R2 is the curvature radius of the arc groove of the non-contact area, and
the arc groove of the non-contact area is formed such that a separating distance between the arc groove of the non-contact area and the ball gradually increases toward an outside from an inside adjacent to the outer side of the end portion of the contact area.

4. The rolling bearing according to claim 2, wherein each of the rolling elements is constituted by a ball,
a section of the contact area taken along an axial direction is formed to be an arc groove having a curvature radius slightly larger than a radius of the ball,
a section of the non-contact area taken along the axial direction is formed to be an arc groove that is continuous with an outer side of an end portion of the arc groove of the contact area,
the curvature radius of the arc groove of the contact area and a curvature radius of the arc groove of the non-contact area are set so as to satisfy a relationship of R1<R2, where R1 is the curvature radius of the arc groove of the contact area and R2 is the curvature radius of the arc groove of the non-contact area, and
the arc groove of the non-contact area is formed such that a separating distance between the arc groove of the non-contact area and the ball gradually increases toward an outside from an inside adjacent to the outer side of the end portion of the contact area.

5. A rolling bearing comprising:
an inner ring having an inner ring raceway surface formed on an outer peripheral surface of the inner ring;
an outer ring having an outer ring raceway surface formed on an inner peripheral surface of the outer ring, and being disposed around an outer periphery of the inner ring with an annular space between the outer ring and the inner ring; and
a plurality of rolling elements rollably disposed between the inner ring raceway surface and the outer ring raceway surface, each of the inner ring raceway surface and the outer ring raceway surface includes:
(1) a contact area configured to contact the rolling elements, and
(2) a non-contact area formed adjacent to an outer side of an end portion of the contact area and configured to not contact the rolling elements;
wherein:
the non-contact area includes a lubricant retaining portion formed by a recessed portion, the non-contact area being configured to retain a lubricant, and
the recessed portion includes a plurality of non-uniform projections and depressions provided in a bottom face of the recessed portion, the plurality of non-uniform projections and depressions not being arranged along a predetermined direction.

6. The rolling bearing according to claim 1, wherein the plurality of non-uniform projections and depressions are formed by a shot blasting treatment.

7. The rolling bearing according to claim 5, wherein the plurality of non-uniform projections and depressions are formed by a shot blasting treatment.

* * * * *